US009887609B2

(12) United States Patent
Lin et al.

(10) Patent No.: US 9,887,609 B2
(45) Date of Patent: Feb. 6, 2018

(54) SHAFTLESS FAN STRUCTURE HAVING AXIAL AIR SLIT

(71) Applicant: COOLER MASTER CO., LTD., New Taipei (TW)

(72) Inventors: Fu-Lung Lin, New Taipei (TW); Shih-Wei Huang, New Taipei (TW); Tsung-Wei Lin, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 205 days.

(21) Appl. No.: 14/875,075

(22) Filed: Oct. 5, 2015

(65) Prior Publication Data
US 2016/0115962 A1 Apr. 28, 2016

(30) Foreign Application Priority Data
Oct. 27, 2014 (CN) .................... 2014 2 0627877 U

(51) Int. Cl.
| F04D 25/06 | (2006.01) |
| H02K 21/24 | (2006.01) |
| F04D 29/28 | (2006.01) |
| F04D 29/42 | (2006.01) |
| H02K 5/173 | (2006.01) |
| F04D 17/16 | (2006.01) |
| F04D 29/059 | (2006.01) |

(52) U.S. Cl.
CPC ............ H02K 21/24 (2013.01); F04D 17/16 (2013.01); F04D 25/0653 (2013.01); F04D 29/059 (2013.01); F04D 29/281 (2013.01); F04D 29/4226 (2013.01); H02K 5/1737 (2013.01)

(58) Field of Classification Search
CPC ............ F04D 25/062; F04D 25/0653; F04D 25/0606; F04D 25/08; F04D 29/626; H02K 21/24; H02K 7/14
USPC ............. 417/420, 423.3, 423.14; 310/156.32
See application file for complete search history.

(56) References Cited

U.S. PATENT DOCUMENTS

| 5,947,704 A * | 9/1999 | Hsieh | F04D 29/059 |
| | | | 417/423.12 |
| 6,462,441 B1 * | 10/2002 | Horng | H02K 5/1737 |
| | | | 310/156.32 |
| 7,553,136 B2 * | 6/2009 | Ku | F04D 25/066 |
| | | | 310/156.32 |
| 7,862,309 B2 * | 1/2011 | Chen | F04D 29/626 |
| | | | 415/220 |
| 9,140,263 B2 * | 9/2015 | Horng | F04D 17/04 |

(Continued)

Primary Examiner — Peter J Bertheaud
(74) Attorney, Agent, or Firm — Maschoff Brennan

(57) ABSTRACT

A shaftless fan structure having an axial air slit includes: a base, including a bottom plate connected with a fasten post; a rotor set, including a impeller sleeved on the fasten post and a magnetic member, wherein the impeller is formed with a bottom surface oppositely arranged with respect to the bottom plate, and the magnetic member is disposed on the bottom surface; a rolling bearing, fastened between the fasten post and the rotor set; and a stator set, disposed on the bottom plate and including a magnetic inducing portion oppositely arranged with respect to the magnetic member, wherein an axial air slit is formed between the magnetic inducing portion and the magnetic member. Accordingly, an objective of being shaftless is achieved, and the total height can be reduced through altering the arrangement of the magnetic member and the stator set.

18 Claims, 8 Drawing Sheets

(56) References Cited

U.S. PATENT DOCUMENTS

| | | | |
|---|---|---|---|
| 9,551,348 B2* | 1/2017 | Lin | F04D 17/16 |
| 2015/0240835 A1* | 8/2015 | Tsai | F04D 19/002 |
| | | | 417/354 |
| 2015/0244213 A1* | 8/2015 | Tsai | H02K 21/24 |
| | | | 310/156.32 |
| 2016/0102669 A1* | 4/2016 | Lin | H02K 21/24 |
| | | | 417/423.7 |
| 2016/0285323 A1* | 9/2016 | Lin | F04D 25/0653 |

* cited by examiner

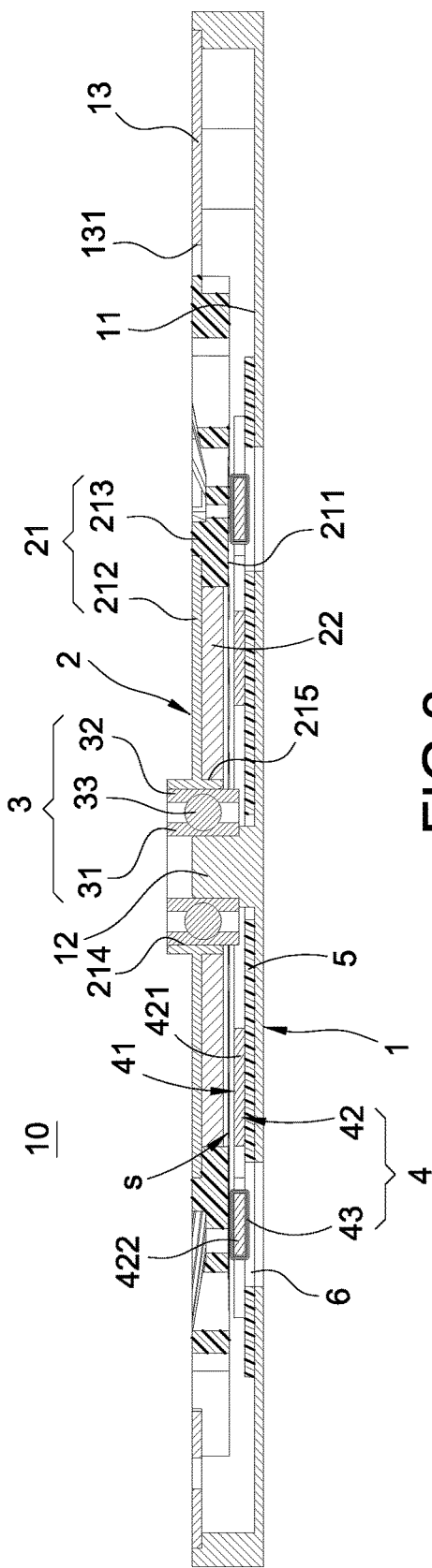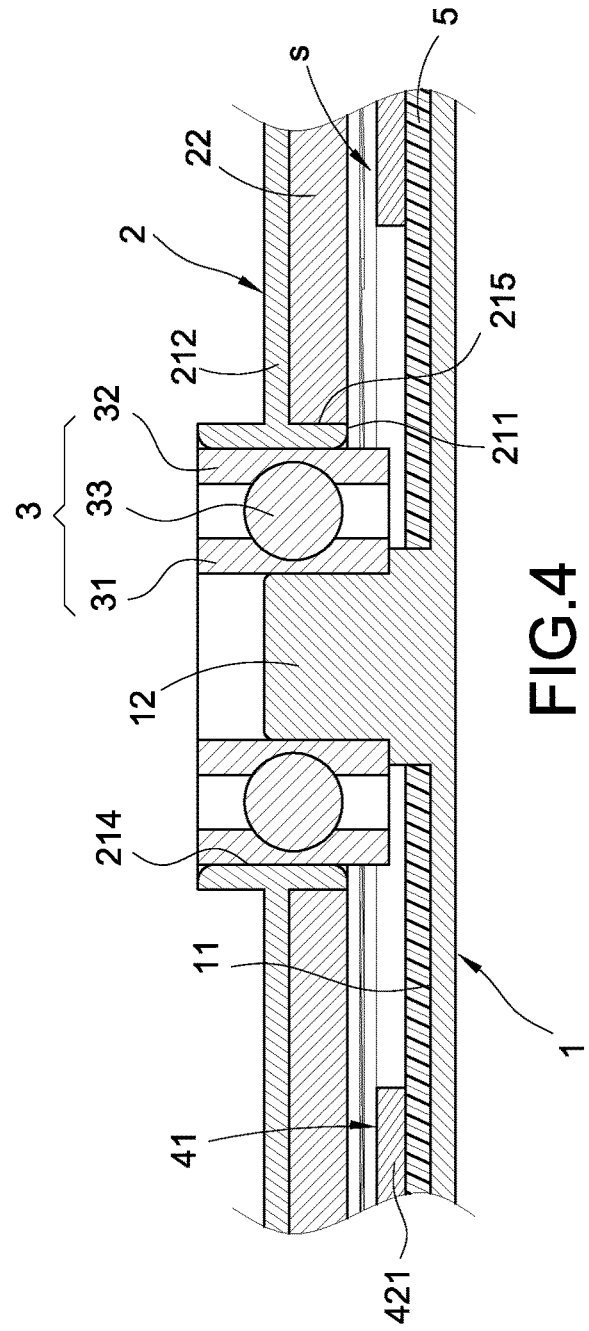

SHAFTLESS FAN STRUCTURE HAVING AXIAL AIR SLIT

BACKGROUND OF THE INVENTION

Field of the Invention

The present invention relates to a fan structure, especially to a shaftless fan structure having an axial air slit.

Description of Related Art

At present, there is a goal of being smaller and thinner for computer-related products, so electronic components and heat dissipation members inside the computer-related products are also required to be smaller and thinner. Wherein, a fan is one of the most common heat dissipation members, the fan is able to provide an excellent heat dissipation effect for allowing the computer-related products to be smaller and thinner, and a better heat dissipation efficiency is also provided.

A conventional heat dissipation fan mainly includes a rotor and a stator, the rotor is composed of a blade wheel and a plurality of blades arranged at the outer periphery of the blade wheel, and a magnetic member is installed inside the blade wheel, the stator includes a plurality of silicon steel sheets and a winding set wound on the silicon steel sheets, the winding set is able to be electrically charged for generating magnetic excitation, and a magnetic field is distributed on the silicon steel sheets, thereby enabling the rotor to rotate through the attracting force or the repulsing force generated between the silicon steel sheets and the magnetic member.

However, the above-mentioned heat dissipation fan has following disadvantages: 1. The center of the blade wheel has to be installed with a shaft core and a shaft sleeve for pivotal connection, so the volume and the thickness of the blade wheel cannot be simplified; 2. The silicon steel sheets are combined with a stacking means and arranged as an annular member for being matched with the magnetic member, thus the axial height of the heat dissipation fan cannot be lowered. As such, under the trend of the heat dissipation fan being smaller, how to reduce the axial height and thickness of the heat dissipation fan is the issue to be solved by the present invention.

Accordingly, the applicant of the present invention has devoted himself for improving the mentioned disadvantages.

SUMMARY OF THE INVENTION

The present invention is to provide a shaftless fan structure having an axial air slit, in which a rolling bearing is used for connecting a rotor set thereby achieving an objective of being shaftless, and the total height of the fan structure can be reduced through altering the arrangement of a magnetic member and a stator set, thereby enabling the fan to be thinner and more compact.

Accordingly, the present invention provides a shaftless fan structure having an axial air slit, which includes: a base, including a bottom plate, wherein the bottom plate is connected with a fasten post; a rotor set, including an impeller and a magnetic member, wherein the impeller is sleeved on the fasten post, the impeller is formed with a bottom surface oppositely arranged with respect to the bottom plate, and the magnetic member is disposed on the bottom surface; a rolling bearing, installed between the fasten post and the rotor set; and a stator set, disposed on the bottom plate and including a magnetic inducing portion, wherein the magnetic inducing portion and the magnetic member are oppositely arranged, and an axial air slit is formed between the magnetic inducing portion and the magnetic member.

BRIEF DESCRIPTION OF DRAWING

FIG. 3 is a cross sectional view showing the shaftless fan structure according to the first embodiment of the present invention;

FIG. 4 is another cross sectional view showing the shaftless fan structure according to the first embodiment of the present invention;

DETAILED DESCRIPTION OF THE INVENTION

Figure 1:
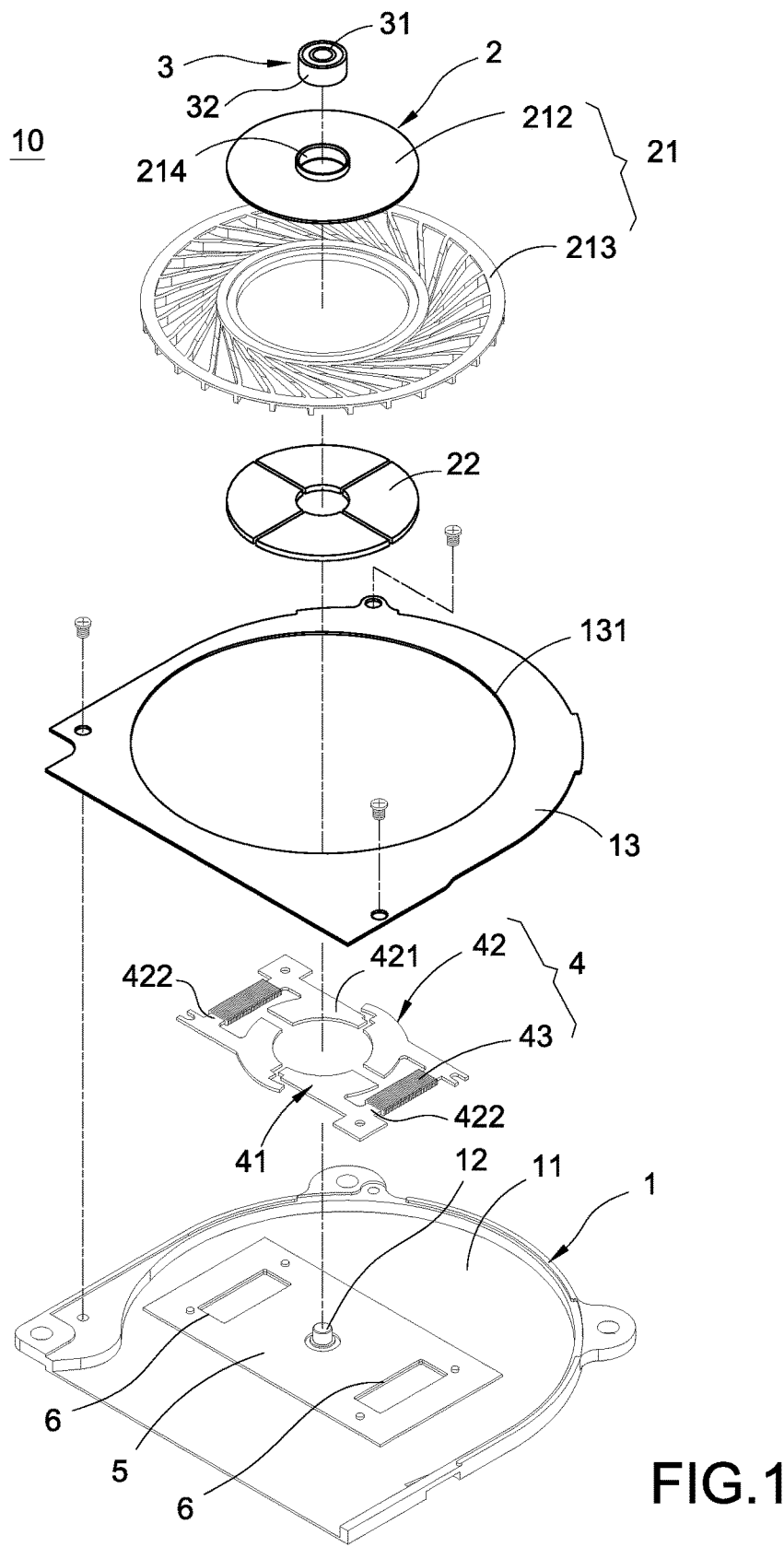
FIG. 1 is a perspective exploded view showing a shaftless fan structure according to a first embodiment of the present invention.
Figure 2:
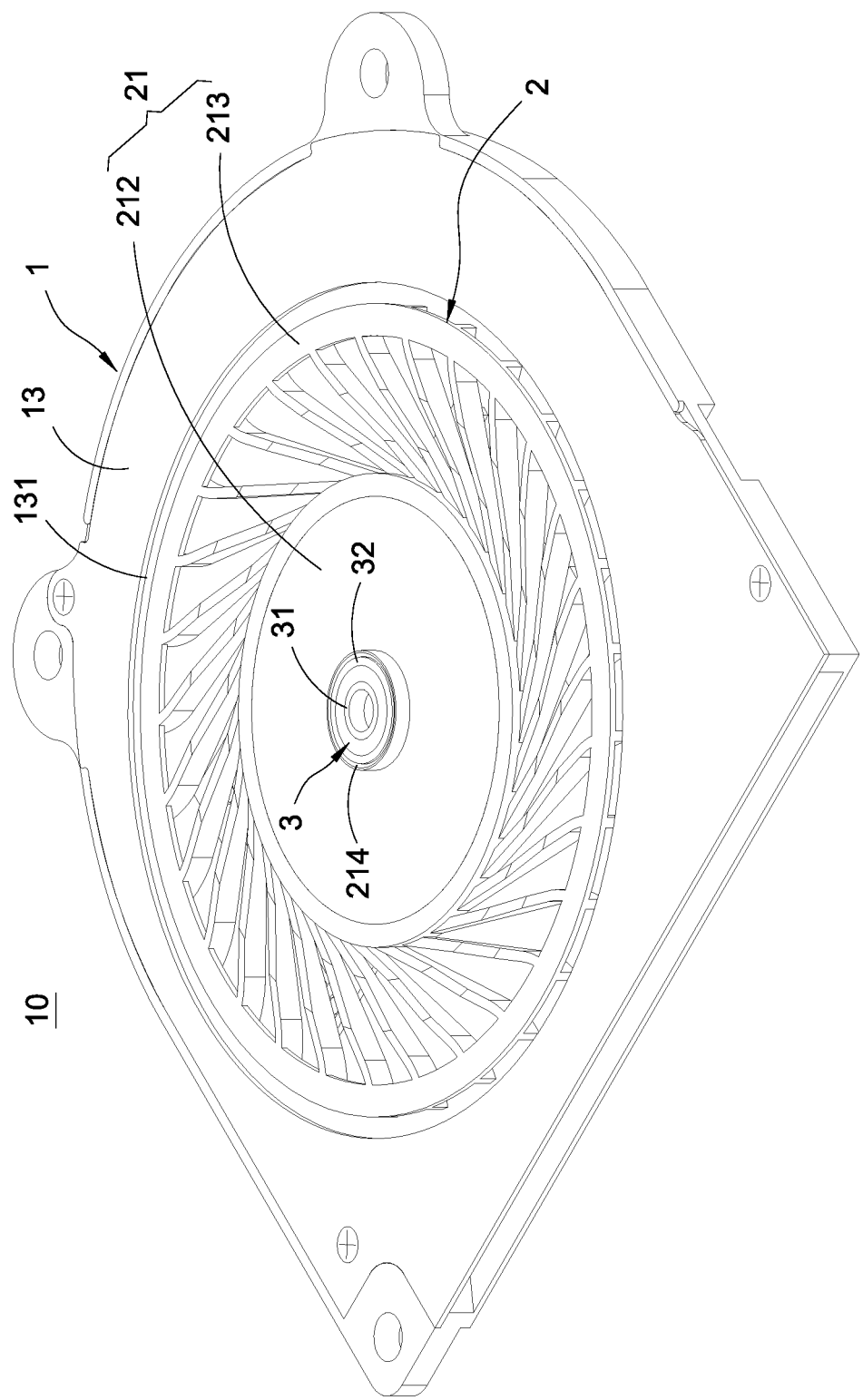
FIG. 2 is a perspective view showing the assembly of the shaftless fan structure according to the first embodiment of the present invention.
Figure 5:
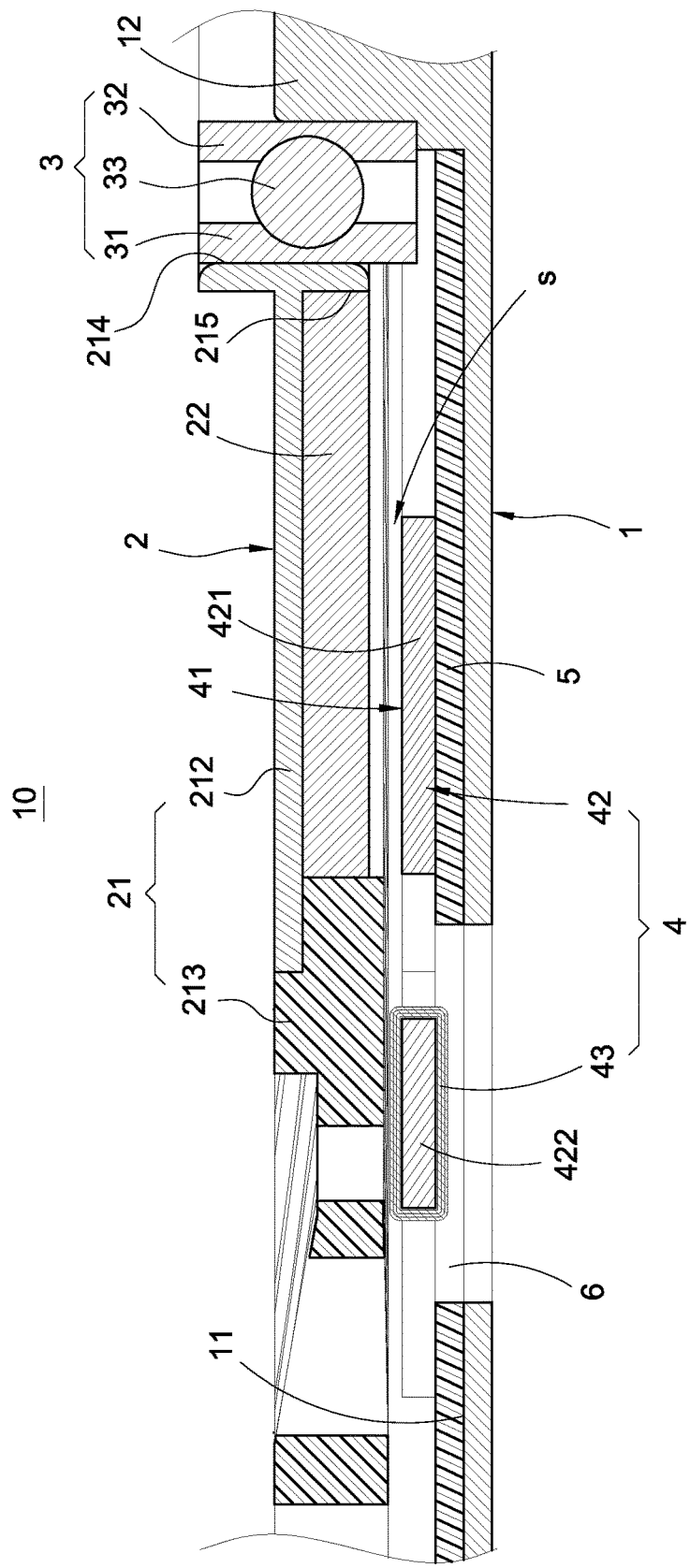
FIG. 5 is one another cross sectional view showing the shaftless fan structure according to the first embodiment of the present invention.

Preferred embodiments of the present invention will be described with reference to the drawings.

Please refer from FIG. 1 to FIG. 5, the present invention provides a shaftless fan structure having an axial air slit. According to a first embodiment of the present invention, the fan structure 10 mainly includes a base 1, a rotor set 2, a rolling bearing 3 and a stator set 4.

The base 1 is formed as a wind shield and includes a bottom plate 11, and a fasten post 12 is connected to the bottom plate 11. In addition, the base 1 includes a top plate 13, and an opening slot 131 is formed on the top plate 13.

The rotor set 2 includes an impeller 21 and a magnetic member 22, the impeller 21 is sleeved on the fasten post 12 and exposed in the opening slot 131. The impeller 21 has a bottom surface 211 oppositely arranged with respect to the bottom plate 11, and the magnetic member 22 is fastened on the bottom surface 211.

Details are provided as follows. The impeller 21 includes a hub 212 and a blade member 213 fastened with the hub 212. The bottom surface 211 is formed on the hub 212, the hub 212 is formed with a bearing opening 214, and the rolling bearing 3 is received in the bearing opening 214.

Wherein, if the hub 212 is made of a metal material, the rolling bearing 3 is received in the bearing opening 214 with a tightening or soldering means. If the hub 212 is made of a plastic material, the rolling bearing 3 is received in the bearing opening 214 with a tightening means.

In addition, the rotor set 2 has a plurality of the magnetic members 22. The hub 212 is formed with a plurality of recesses 215 on bottom surface 211 and annularly arranged at the outer periphery of the bearing opening 214, and the magnetic member 22 is mounted in the recess 215, thereby allowing the plural magnetic members 22 to be annularly arranged.

The rolling bearing 3 is installed between the fasten post 12 and the rotor set 2 and includes an inner ring 31, an outer ring 32 and a plurality of rolling members 33 disposed between the inner ring 31 and the outer ring 32. The inner ring 31 is fastened with the fasten post 12, and the outer ring 32 is fastened with impeller 21 and operated with the impeller 21. Wherein, the rolling bearing 3 can be a ball bearing, a roller bearing or a needle bearing.

The stator set 4 is disposed on the bottom plate 11 and includes a magnetic inducing portion 41. The magnetic inducing portion 41 is oppositely arranged with respect to the magnetic member 22, and an axial air slit S is formed between the magnetic inducing portion 41 and the magnetic member 22.

Details are provided as follows. The stator set 4 includes a magnetic conducting sheet 42 and a plurality of winding sets 43, wherein the magnetic conducting sheet 42 is a silicon steel sheet and disposed on the bottom plate 11. The magnetic inducing portion 41 includes an annular magnetic conducting zone 421 extended from the magnetic conducting sheet 42 and surrounding the outer periphery of the fasten post 12. The magnetic conducting sheet 42 is extended with a plurality of winding sheets 422 at different sides of the annular magnetic conducting zone 421, and the winding sets 43 are respectively wound on the winding sheets 422. Wherein, the annular magnetic conducting zone 421 and the winding sheets 422 are arranged to be in parallel with the bottom plate 11.

According to the present invention, the shaftless fan structure 10 further includes a circuit board 5. The circuit board 5 is fastened on the bottom plate 11, the bottom plate 11 and the circuit board 5 are jointly formed with a plurality of accommodation slots 6, the magnetic conducting sheet 42 is disposed on the circuit board 5, the winding sets 43 are electrically connected to the circuit board 5 and respectively accommodated in the accommodation slots 6, the circuit board 5 is served to control whether the winding sets 43 being electrically charged for generating an electromagnetic effect, so the magnetic member 22 is able to be driven to rotate relative to the magnetic inducing portion 41, and the impeller 21 is operated with the rotation of the magnetic member 22.

In the shaftless fan structure 10 of the present invention, the base 1 includes the bottom plate 11, and the fasten post 12 is connected to the bottom plate 11. The rotor set 2 includes the impeller 21 and the magnetic member 22, wherein the impeller 21 is sleeved on the fasten post 12. The impeller 21 is formed with the bottom surface 211 oppositely arranged with respect to the bottom plate 11, and the magnetic member 2 is disposed on the bottom surface 211. The rolling bearing 3 is installed between the fasten post 12 and the rotor set 2. The stator set 4 is disposed on the bottom plate 11 and includes the magnetic inducing portion 41. The magnetic inducing portion 41 is oppositely arranged with respect to the magnetic member 22, and the axial air slit S is formed between the magnetic inducing portion 41 and the magnetic member 22. Accordingly, the rolling bearing 3 is used for connecting the rotor set 2 for achieving an objective of being shaftless, the total height of the shaftless fan structure 10 can be reduced through altering the arrangement of the magnetic member 22 and the stator set 4, so the shaftless fan structure 10 is able to be thinner and more compact.

In the shaftless fan structure 10 of the present invention, the rolling bearing 3 is installed between the fasten post 12 and rotor set 2, the inner ring 31 is fastened with the fastened post 12, the outer ring 32 is fastened with the impeller 21 and operated with the impeller 21, so as to make the stator set 4 to generate an electromagnetic effect for driving the magnetic member 22 to rotate relative to the magnetic inducing portion 41. In addition, the impeller 21 is operated with the rotation of the magnetic member 22, the rolling bearing 3 is used for connecting the fasten post 12 and the rotor set 2, so that the shaft core and the shaft sleeve of the conventional heat dissipation fan can be replaced and the objective of being shaftless is achieved.

In addition, the magnetic member 22 is disposed on the bottom surface 211 of the impeller 21. The magnetic inducing portion 41 is disposed on the bottom plate 11 and oppositely arranged with respect to the magnetic member 22, the axial air slit S is formed between the magnetic inducing portion 41 and the magnetic member 22, so the radial arrangement of the conventional magnetic member and the stator with respect to the impeller can be altered to the axial arrangement of the magnetic member 22 and the stator set 4 with respect to the impeller 21, so the height and the thickness of the shaftless fan structure 10 can be reduced, thereby allowing the shaftless fan structure 10 to be thinner and more compact.

Moreover, the bottom plate 11 and the circuit board 5 are jointly formed with a plurality of the accommodation slots 6, the magnetic conducting sheet 42 is disposed on the circuit board 5, the winding sets 43 are electrically connected to the circuit board 5 and respectively accommodated in the accommodation slots 6, the top plate 13 of the base 1 is formed with the opening slot 131, the impeller 21 is exposed in the opening slot 131, thereby allowing the height and the thickness of the shaftless fan structure 10 to be effectively reduced.

Figure 6:
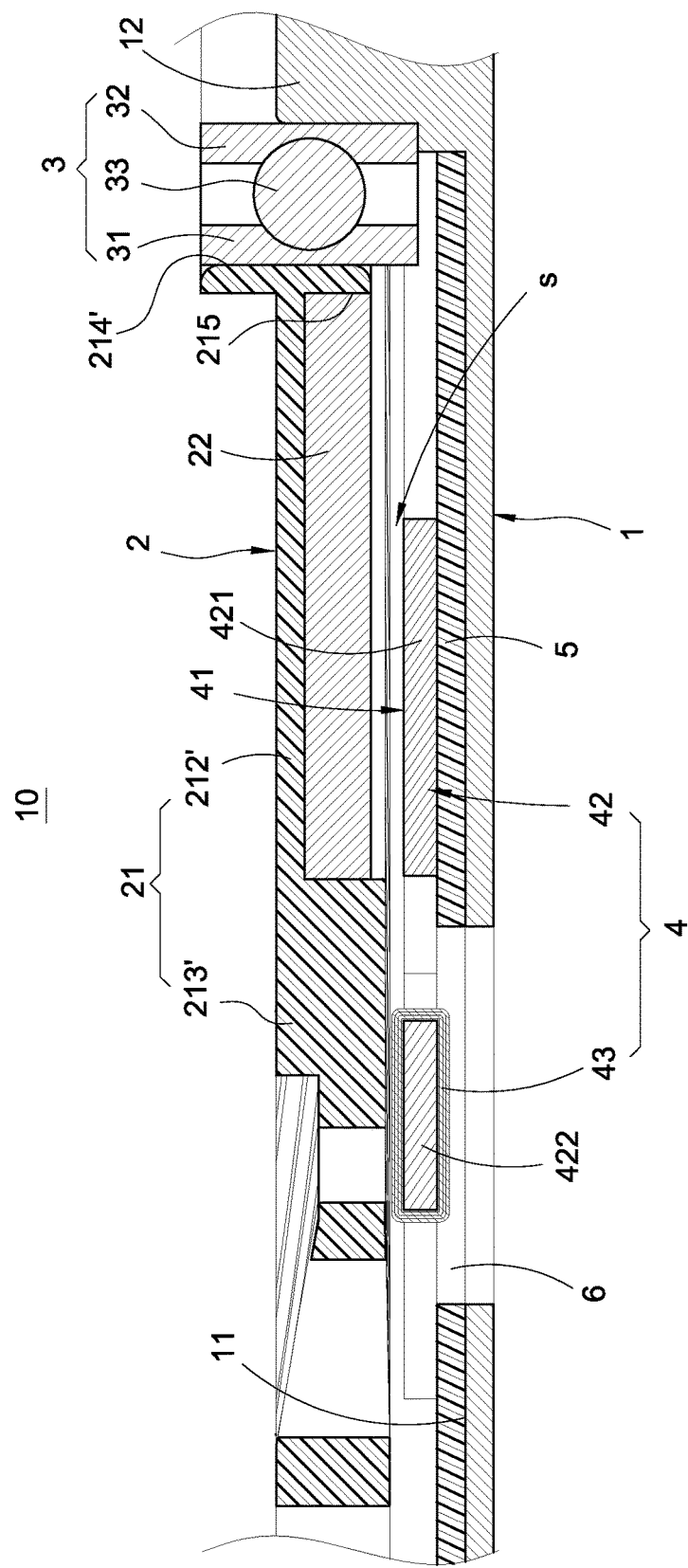
FIG. 6 is a cross sectional view showing the shaftless fan structure according to a second embodiment of the present invention.

Please refer to FIG. 6, which discloses a second embodiment of the shaftless fan structure 10 provided the present invention. The second embodiment is substantially the same as the first embodiment, and the difference between the second embodiment and the first embodiment is that a blade member 213' is extended from the outer periphery of a hub 212'.

Details are provided as follows. The impeller 21 includes the hub 212' and the blade member 213' extended from the outer periphery of the hub 212'. The bottom surface 211 is formed on the hub 212', so that the same functions and effects provided by the first embodiment can also be achieved.

Figure 7:
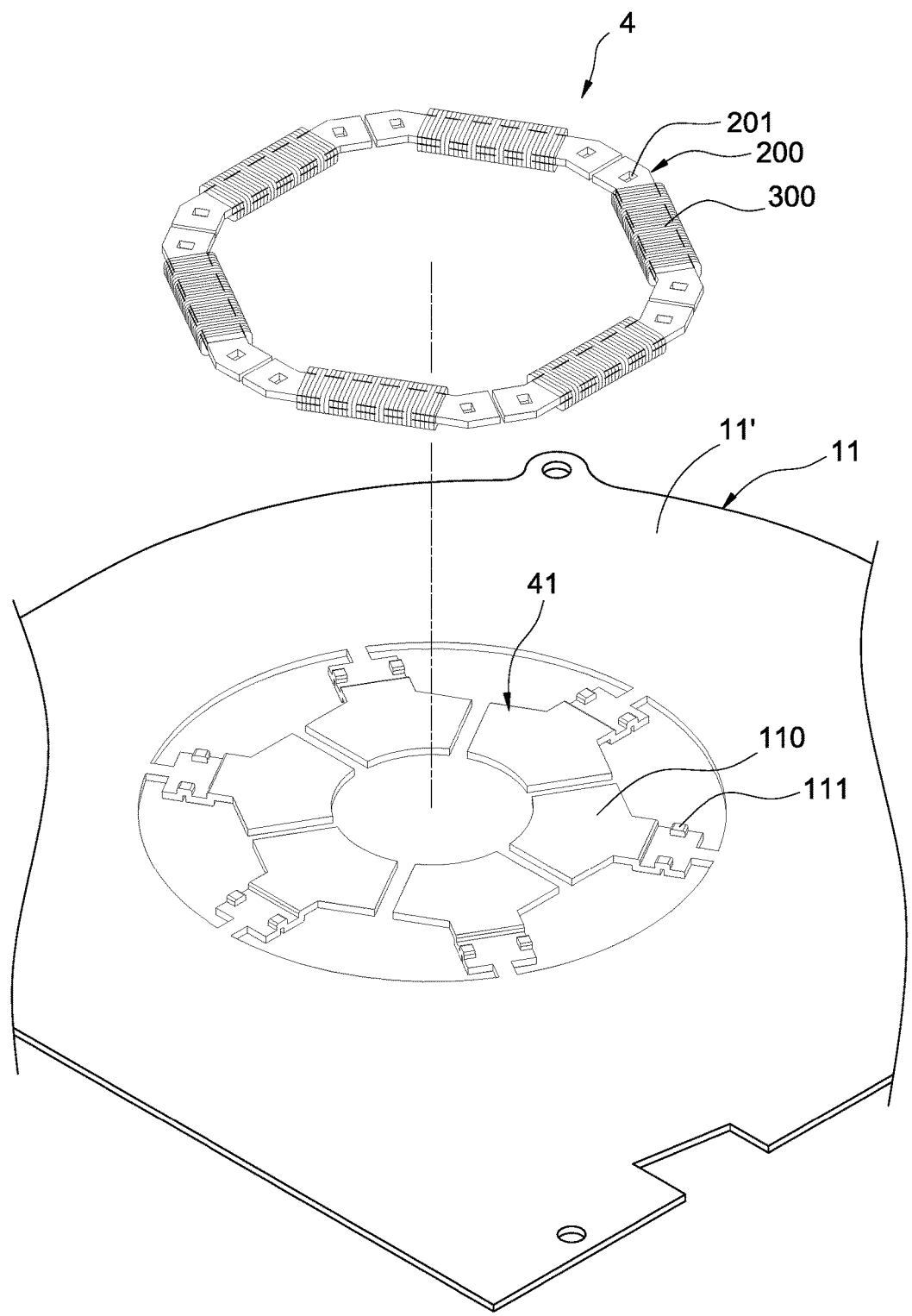
FIG. 7 is a perspective exploded view showing the shaftless fan structure according to a third embodiment of the present invention.
Figure 8:
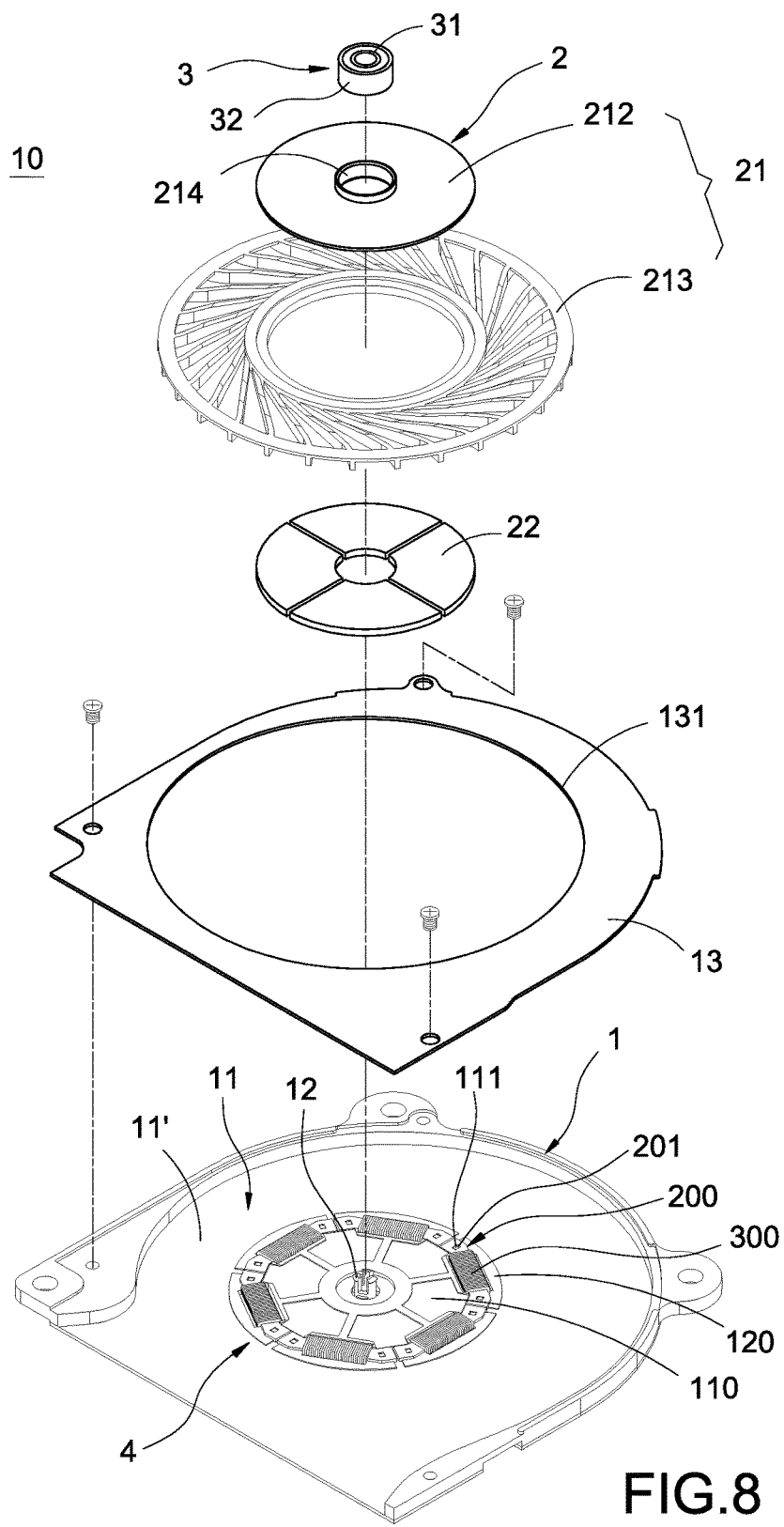
FIG. 8 is another perspective exploded view showing the shaftless fan structure according to the third embodiment of the present invention.

Please refer to FIG. 7 and FIG. 8, which disclose a third embodiment of the shaftless fan structure 10 provided by the present invention. The third embodiment is substantially the same as the first embodiment, and the difference between the third embodiment and the first embodiment is the configuration of the stator set 4.

Details are provided as follows. The bottom plate 11 is a metal plate 11', and the metal plate 11' is preferably made of a silicon steel plate. The stator set 4 includes a plurality of columnar coils 300 and a plurality of pole pieces 110 formed on the metal plate 11'. Wherein, the metal plate 11' is formed with the annularly-arranged pole pieces 110 with a punching means. Wherein, a coil seat 120 is respectively disposed between every two of the adjacent pole pieces 110, and the columnar coil 300 is received in the coil seat 120.

In addition, the magnetic inducing portion 41 is configured by the pole pieces 110 being annularly arranged, the pole pieces 110 are spaced with intervals and the outer ends thereof are connected to each other. Each of the pole pieces 110 is formed with a pair of latching tenons 111.

An iron core 200 is respectively installed between every two of the adjacent pole pieces 110, and the iron core 200 is preferably made of a silicon steel plate. Two ends of the iron core 200 are respectively formed with a penetrated hole 201, and the penetrated hole 201 is latched with the corresponding latching tenon 111 formed on the pole piece 110, so that two ends of the iron core 200 are respectively latched with the adjacent pole pieces 110. Therefore, the iron core 200 can be fastened on the metal plate 11'. Two ends of the iron core 200 can also be respectively soldered on the adjacent pole pieces 110.

Figure 9:
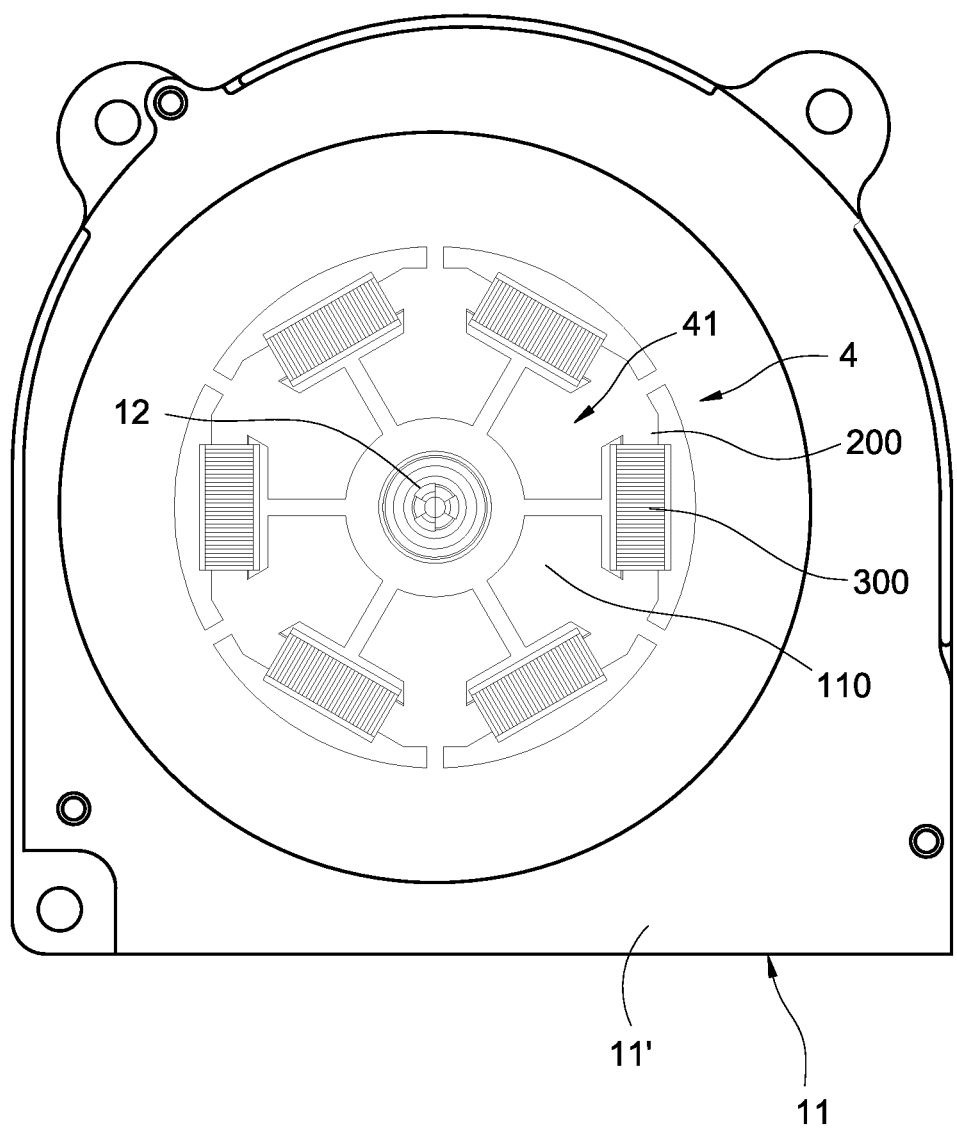
FIG. 9 is a schematic view showing the assembly of the shaftless fan structure according to a fourth embodiment of the present invention.

In addition, each of the iron cores 200 is wound with a columnar coil 300, so that each of the columnar coils 300 can be disposed between every two of the adjacent pole pieces 110. Two ends of each of the columnar coils 300 are respectively disposed corresponding to the adjacent pole pieces 110. When the columnar coil 300 is electrically charged, an induced magnetic field is generated for polarizing the pole pieces 110 at two ends of the columnar coil 300. Accordingly, the same functions and effects provided by the first embodiment can also be achieved. Please refer to FIG. 9, which discloses a fourth embodiment of the shaftless fan structure 10 provided by the present invention. The fourth embodiment is substantially the same as the third embodiment, and the difference between the fourth embodiment and the third embodiment is that two ends of the iron core 200 are respectively connected to the adjacent pole pieces 110.

Details are provided as follows. According to the fourth embodiment, two ends of the iron core 200 are respectively connected to the adjacent pole pieces 110, in other words, the iron core 200 is disposed on the metal plate 11' with a punching means. Each of the iron cores 200 is wound with the columnar coil 300, thereby allowing the columnar coils 300 to be respectively disposed between every two of the adjacent pole pieces 110, and two ends of the columnar coil 300 are respectively disposed corresponding to the adjacent pole pieces 110. When the columnar coil 300 is electrically charged, an induced magnetic field is generated for polarizing the pole pieces 110 at two ends of the corresponding columnar coil 300. Accordingly, the same functions and effects provided by the third embodiment can also be achieved.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A shaftless fan structure having an axial air slit, including:
   a base, including a bottom plate and a fasten post, wherein the fasten post is connected the bottom plate;
   a rotor set, including an impeller and a magnetic member, wherein the impeller is sleeved on the fasten post, the impeller has a bottom surface oppositely arranged with respect to the bottom plate, and the magnetic member is disposed on the bottom surface;
   a rolling bearing, installed between the fasten post and the rotor set; and
   a stator set, comprising a magnetic inducing portion, a magnetic conducting sheet and a plurality winding sets, the magnetic conducting sheet disposed on the bottom plate the magnetic inducing portion comprising an annular magnetic conducting zone extended from the magnetic conducting sheet and surrounding the outer periphery of the fasten post, the magnetic conducting sheet is extended with a plurality of winding sheets at different sides of the annular magnetic conducting zone, and the winding sets are respectively wound on the winding sheets, wherein the magnetic inducing portion and the magnetic member are oppositely arranged, and the axial air slit is formed between the magnetic inducing portion and the magnetic member.

2. The shaftless fan structure having the axial air slit according to claim 1, wherein the impeller includes a hub and a blade member fastened with the hub, and the bottom surface is formed on the hub.

3. The shaftless fan structure having the axial air slit according to claim 2, wherein the hub is formed with a bearing opening, and the rolling bearing is received in the bearing opening with a tightening or soldering means.

4. The shaftless fan structure having the axial air slit according to claim 2, wherein there are a plurality of the magnetic members, the hub is formed with a plurality of annularly-arranged recesses on the bottom surface, and the magnetic members are mounted in the recesses.

5. The shaftless fan structure having the axial air slit according to claim 1, wherein the impeller includes a hub and a blade member extended from an outer periphery of the hub, and the bottom surface is formed on the hub.

6. The shaftless fan structure having the axial air slit according to claim 5, wherein the hub is formed with a bearing opening, and the rolling bearing is received in the bearing opening with a tightening or soldering means.

7. The shaftless fan structure having the axial air slit according to claim 5, wherein the rotor set further includes a plurality of the magnetic members, the hub is formed with a plurality of annularly-arranged recesses on the bottom surface, and the magnetic members are mounted in the recesses.

8. The shaftless fan structure having the axial air slit according to claim 1, wherein the annular magnetic conducting zone and the winding sheets are arranged to be in parallel with the bottom plate.

9. The shaftless fan structure having the axial air slit according to claim 1, furthering including a circuit board, the circuit board is fastened on the bottom plate, the bottom plate and the circuit board are jointly formed with a plurality of accommodation slots, the magnetic conducting sheet is disposed on the circuit board, and the winding sets are electrically connected to the circuit board and respectively accommodated in the accommodation slots.

10. The shaftless fan structure having the axial air slit according to claim 1, wherein the rolling bearing includes an inner ring, an outer ring and a plurality of rolling members disposed between the inner ring and the outer ring, the inner ring is fastened with the fasten post, and the outer ring is fastened with impeller and operated with the impeller.

11. The shaftless fan structure having the axial air slit according to claim 1, wherein the rolling bearing is a ball bearing, a roller bearing or a needle bearing.

12. The shaftless fan structure having the axial air slit according to claim 1, wherein the base includes a top plate, an opening slot is formed on the top plate, and the impeller is exposed in the opening slot.

13. The shaftless fan structure having the axial air slit according to claim 1, wherein the bottom plate is a metal plate, the stator set includes a plurality of columnar coils and a plurality of pole pieces formed on the metal plate, the magnetic inducing portion is configured by the pole pieces being annularly arranged, the columnar coils are respectively disposed between every two of the adjacent pole pieces, and two ends of the columnar coil are respectively disposed corresponding to the adjacent pole pieces.

14. The shaftless fan structure having the axial air slit according to claim 13, wherein the stator set includes a plurality of iron cores, each of the iron cores is disposed between each pair of the adjacent pole pieces, and each of the columnar coils is wound on the corresponding iron core.

15. The shaftless fan structure having the axial air slit according to claim 14, wherein two ends of the iron core are respectively soldered on the adjacent pole pieces.

16. The shaftless fan structure having the axial air slit according to claim 14, wherein two ends of the iron core are respectively latched with the adjacent pole pieces.

17. The shaftless fan structure having the axial air slit according to claim 16, wherein two ends of the iron core are respectively formed with a penetrated hole, and each of the pole pieces is formed with a pair of latching tenons corresponding to each of the penetrated holes.

18. The shaftless fan structure having the axial air slit according to claim 14, wherein a coil seat is respectively disposed between every two of the adjacent pole pieces, and the columnar coil is received in the coil seat.

* * * * *